United States Patent [19]

Ayers

[11] Patent Number: 4,480,858
[45] Date of Patent: Nov. 6, 1984

[54] FLEXIBLE PIPELINE JOINTS

[75] Inventor: Ray R. Ayers, Houston, Tex.

[73] Assignee: Shell Oil Company, Houston, Tex.

[21] Appl. No.: 487,435

[22] Filed: Apr. 21, 1983

Related U.S. Application Data

[62] Division of Ser. No. 163,557, Jun. 27, 1980, Pat. No. 4,421,345.

[51] Int. Cl.³ ............................................. F16L 27/00
[52] U.S. Cl. ..................................... 285/114; 285/229
[58] Field of Search ............... 285/229, 114, 228, 227, 285/226, 223

[56] References Cited

U.S. PATENT DOCUMENTS

| | | | |
|---|---|---|---|
| 327,215 | 9/1885 | Youngs | 285/229 |
| 1,475,289 | 11/1923 | Diescher | 285/229 X |
| 1,696,435 | 12/1928 | Fraley | 285/229 |
| 2,180,128 | 11/1939 | Stancliffe | 285/229 X |
| 2,406,234 | 8/1946 | Marancik et al. | 285/227 X |
| 2,865,660 | 12/1958 | Zallea | 285/227 |
| 2,930,116 | 3/1960 | Minges | 285/227 X |
| 3,061,039 | 10/1962 | Peters | 285/228 X |
| 3,184,917 | 5/1965 | Caovette et al. | 285/286 X |
| 3,695,637 | 10/1972 | Satterthwaite et al. | 285/286 X |
| 3,730,566 | 5/1973 | Kazmievski et al. | 285/229 |
| 3,820,829 | 6/1974 | Hasselbacher et al. | 285/226 |
| 3,837,685 | 9/1974 | Miller | 285/226 X |
| 3,950,016 | 4/1976 | Worley | 285/226 X |
| 3,951,165 | 4/1976 | Seger et al. | 285/114 X |
| 4,221,502 | 9/1980 | Tanikawa | 285/114 X |

FOREIGN PATENT DOCUMENTS

| | | | |
|---|---|---|---|
| 1187073 | 2/1965 | Fed. Rep. of Germany | 285/223 |
| 569076 | 4/1924 | France | 285/229 |
| 2376993 | 9/1978 | France | 285/229 |
| 289599 | 5/1928 | United Kingdom | 285/229 |
| 908025 | 10/1962 | United Kingdom | 285/229 |
| 1096461 | 12/1967 | United Kingdom | 285/227 |
| 1194109 | 6/1970 | United Kingdom | 285/226 |
| 560095 | 5/1977 | U.S.S.R. | 285/229 |

*Primary Examiner*—Thomas F. Callaghan

[57] ABSTRACT

A flexible length of pipe is formed from at least two pipe sections joined by a flexible element such as a closed toroidal shell or open convoluted forms.

1 Claim, 7 Drawing Figures

FLEXIBLE PIPELINE JOINTS

This is a division of application Ser. No. 163,557, filed June 27, 1980, now Pat. No. 4,421,345.

BACKGROUND OF THE INVENTION

Two pipe ends can be joined easily when the pipes are very flexible in bending. Some pipe materials are more flexible than others, e.g., rubber hoses are more flexible than steel pipe, and small diameter pipes are more flexible than larger diameter pipes. Generally, for a given material, the flexibility of the pipe is proportional to the cube of the diameter of the pipe.

Large pipes, for example 18–60 inches in diameter, are so stiff that field bends usually are not feasible, and bends are made in these pipes in special plants designed for this purpose. In the case of submarine pipeline joints made on-bottom, it is difficult to both manipulate and align the ends of large diameter pipes for joining because such pipes are stiff axially as well as in bending. Remote control operations and handling of massive equipment from surface vessels also add substantially to the difficulties of these problems.

Accordingly, the present invention provides a new and useful flexible element which substantially alleviates or overcomes the above noted problems of the prior art and provides further advantages as will be more apparent hereinafter.

SUMMARY OF THE INVENTION

The present invention pertains to a flexible element useful for joining pipelines, which element can be used to make a length of pipe more flexible axially, as well as in bending. The flexible element can be used in submarine pipelaying (where pipe alignment is difficult) to add flexibility to the line at discrete locations along the length thereof. This would assist, for example, in joining two strings of pipe together by welding or by using mechanical connectors. One specific use is in bringing two flanges together. If there is a rotational (bending) misalignment between the flanges, the flexible element can make it easier to achieve the required rotation thereby permitting clamping of the flanges. If there is an axial gap between flanges, the flexible element can reduce the force required to close this gap.

More specifically, the present invention pertains to a flexible length of pipe composed of at least two pipe sections joined by a flexible element disposed between the ends of the two pipe sections. The flexible element may have somewhat open configurations such as that of a toroid with a semi-circular cross section or other forms of a cylindrical shell with at least one convolution around the circumference welded to the pipe ends to form a pressure-tight joint. The flexible element can thus be thought of as a ring-like section approximating a short joint of pipe, welded between two pipe ends. If the flexible element (ring) were, in fact, a short joint of pipe it would be no more flexible than the pipe. If the ring cross section is curved or convoluted, then the ring becomes more flexible in the pipe axis direction. This is because the element flexes in bending in addition to stretching. And, the bending flexure is much greater than strenching alone. Also, the flexible ring element may have an open-sided rectangular cross section and join the pipe sections so that the innermost parts of the ring connect with the pipe ends. A solid insert such as a solid ring or other inserts which are lined up like a ring may be utilized adjacent to the convolutions (inside or outside of the flexible element) to prevent the deformation of the element beyond a prescribed amount. Other features of the invention will be apparent from the following description.

DESCRIPTION OF PREFERRED EMBODIMENTS

The present invention pertains to a flexible element for joining pipelines, useful for making a length of pipe more flexible axially as well as in bending, depending upon the exact design of the pipeline. It is useful particularly in submarine pipelaying to add flexibility to the line at discrete locations along the length thereof to assist, for instance, in the joining of two strings of pipe together by mechanical connectors or by welding. It also can be used to bring flanges together, or in the event that there is a rotational misalignment, the element can make it easier to achieve rotation to permit clamping of the pipes. Similarly, if there is an axial gap between flanges, a flexible element reduces the force required to close the gap. In addition, another application of the flexible element of the invention is to compensate for thermal effects on pipelines, thereby acting as an axial contraction or expansion joint. Internal inserts and/or external and internal clamps can be used to limit the rotation and axial elongation occurring.

Figure 1:
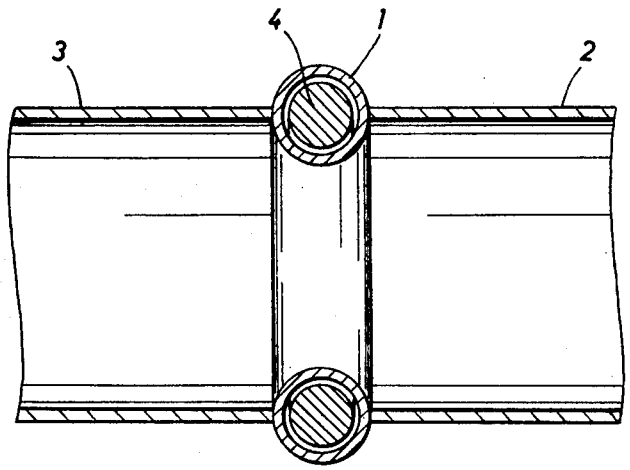
FIG. 1 shows a profile of two pipe ends connected by a circular toroidal element. The reduced pipe diameter of this basic concept makes it less preferred than some of the embodiments following.

Referring to the drawings, FIG. 1 provides a profile of two pipe ends connected by a circular toroidal element of diameter equal to that of the pipe. Thus, toroid is placed between pipe end 2 and pipe end 3. A solid insert 4 is placed inside the toroid 1. Such inserts, frequently solid rod segments, limit the deformation of the toroid produced by axial or bending loads in the pipe.

Figure 2:
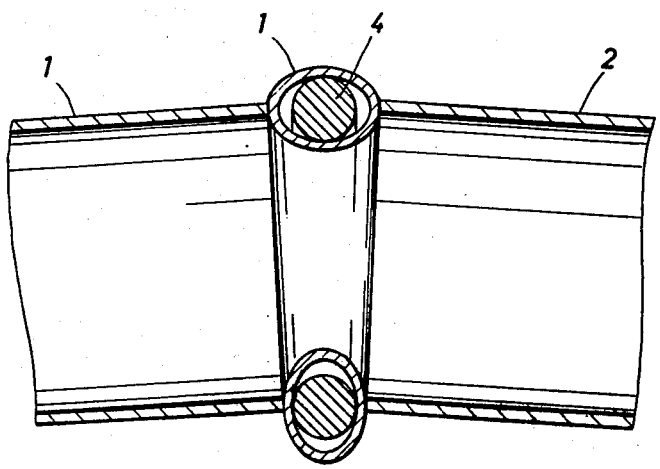
FIG. 2 depicts an exaggerated deformation of the toroidal element due to bending moment in the pipe.

Exaggerated deformation of the toroidal flexible element 1 is shown in FIG. 2. This deformation is due to a bending moment in the pipeline. Inserts 4 stop the ovalling of the toroid once the prescribed amount occurs. The inserts preclude buckling of the toroid and produce a stiffness condition similar to that of a bent pipe without a flexible element. In a similar manner, a toroidal flexible element can be used to flex due to axial loads. Of course, flexing may be due to the combined effects of axial and bending loads as well.

In normal pipeline operations, it frequently is desirable to pass a cleaning ball or cylindrical "pig" through the line without obstruction. For this operation to be effected with the present invention, the toroid must be of larger mean diameter so that its minimum diameter is at least equal to the pipe diameter. The eccentric toroid of FIG. 3 accomplishes this purpose. It will be noted that pipeline 30 has a bell shaped end 31 which allows the toroidal element 1 and insert 4 to be placed outside of the diameter of the pipe which, of course, allows pigs or other cleaning elements to be passed through the pipe without obstruction.

Insert 4 can be a ring-shaped rod or a thick-walled pipe. Alternatively, the insert can be multiple straight rod or pipe elements, of short enough lengths to minimize curvature effects, or even multiple balls. If it is desired to prevent axial deformation while permitting bending deformation in a predetermined plane, the multiple balls, rods, pipes, etc. may be of varying diameters. In yet another embodiment, a previously flexed joint can be rigidized by filling the flexible toroid with a grouting medium such as epoxy or concrete.

Buckling or deformation of the toroid can also be controlled by fluid filling and/or by pre-pressurization. If, however, rigid inserts are used, the toroid can be vented to the inside of the pipe or to the outside of the pipe, depending on the ratio of internal and external pressures, in order to minimize principal stresses and thus minimize fatigue damage due to fluctuations in internal pressure.

Figure 3:
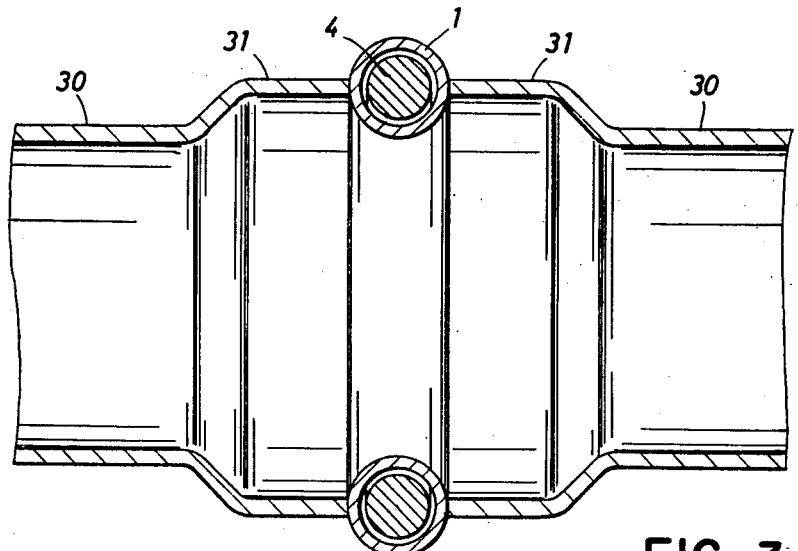
FIG. 3 shows a toroid made of larger mean diameter so that its minimum diameter is at least equal to the pipe inside diameter.
Figure 4A:
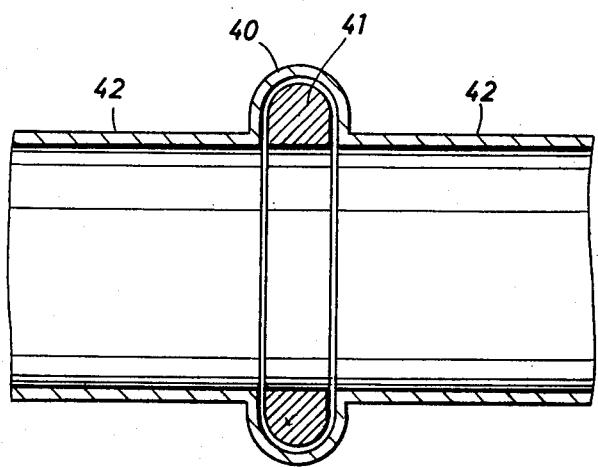
FIG. 4 discloses other more preferred forms of the flexible element such as a semi-circular shape in FIG. 4(a) and a straight line version of FIG. 4(b).
Figure 4B:
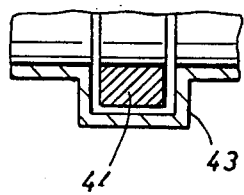

FIGS. 4(a) and 4(b) show other more flexible and potentially more useful versions of the flexible element other than the eccentric toroid of FIG. 3, which may be employed in order to permit passing of a pig or cleaning ball through a pipeline. In FIG. 4(a) the flexible element 40 has a semi-circular convoluted shape and the insert 41 has a shape similar to that of the toroid. The diameter of pipeline 42 is thus the same as the minimum diameter of the semi-circular shape and insert. An alternative embodiment is shown in FIG. 4(b) which employs a flexible element having a flat-sided rectangular cross section 43 and has a solid insert ring 44 which is similar in shape to the rectangular flexible element.

Figure 5:
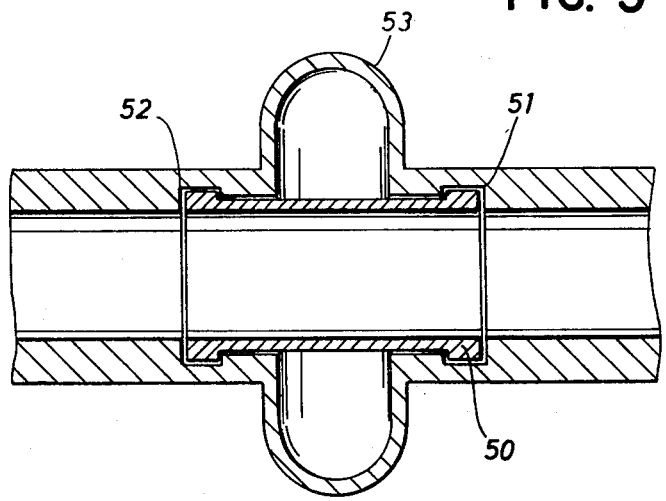
FIG. 5 shows a version of the element using a wide interior shell-like ring with ridges on each end to limit deformations.

FIG. 5 shows a version of the flexible element using a wide internal retaining ring 50 instead of the narrow inserts previously described. Ring 50 has ridged ends which fit into grooves 51 and 52 inside the pipe on both sides of the flexible element 53. Thus, the ring replaces previously dedcribed inserts which would not be effective in tension. External mechanical ring clamps, not shown, fitting around and outside the convolution or convolutions may be employed to limit deformations.

Figure 6:
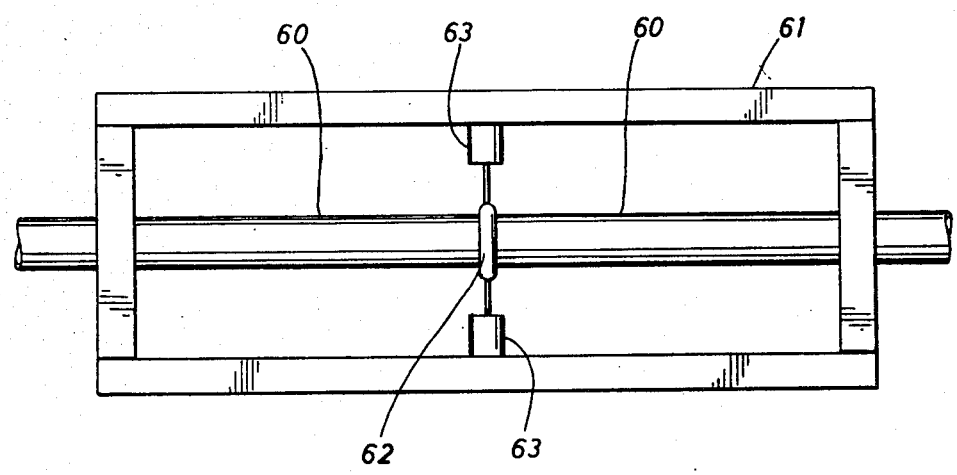
FIG. 6 provides an embodiment wherein flexible elements are incorporated as part of a three-point bending frame.

Flexible elements as shown in the above described figures can also be incorporated as part of a three point bending frame as shown in FIG. 6 so that bending energy can be applied to achieve rotation. The distortion can be limited and then locked in by the loading means. Pipe 60 extends through three point frame 61, and flex element 62 is held in place by loading means 63 such as a pair of hydraulic jacks. The jacks can be self-locking or otherwise locked to prevent subsequent movements of the joint.

The flexible elements or convolutions of the present invention can be utilized in series, using any of the previously described variations in order to solve any problem connected with laying pipelines in the event that a single flexible element is insufficient to produce the required bending or axial flexing of the line. Other combinations of the above described elements will be evident to those skilled in the art without exercise of invention beyond that above described.

What is claimed:

1. A flexible length of pipe comprising at least two pipe ends flexibly joined with a flexible metallic element which is circumferentially outwardly extending and concave to the interior of the pipe and an interior retaining widering sleeve having ridges at its ends to fit into circumferential grooves on the interior surface of the pipe sections on both sides of the flexible element which separates the interior of the flexible element from the interior of the pipe, the inside surface of the retaining sleeve being essentially flush with the inside surfaces of the pipe sections.

* * * * *